(12) United States Patent
Togami et al.

(10) Patent No.: US 7,056,034 B2
(45) Date of Patent: Jun. 6, 2006

(54) PASSIVE ALIGNMENT OF LASER WITH LENS ASSEMBLY

(75) Inventors: Chris K Togami, San Jose, CA (US); Rudolf J. Hofmeister, Sunnyvale, CA (US); Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/027,041

(22) Filed: Dec. 30, 2004

(65) Prior Publication Data

US 2005/0226570 A1    Oct. 13, 2005

Related U.S. Application Data

(60) Provisional application No. 60/533,115, filed on Dec. 30, 2003.

(51) Int. Cl.
*G02B 6/36* (2006.01)

(52) U.S. Cl. .............................. 385/88; 385/90; 385/94

(58) Field of Classification Search .................. 385/14, 385/31, 33, 50, 52, 56, 72, 74, 90, 94, 88–93
See application file for complete search history.

(56) References Cited

U.S. PATENT DOCUMENTS

| | | | |
|---|---|---|---|
| 5,546,489 A * | 8/1996 | Sasaki et al. .................. 385/88 |
| 6,243,508 B1 * | 6/2001 | Jewell et al. .................. 385/14 |

* cited by examiner

*Primary Examiner*—John D. Lee
*Assistant Examiner*—Rhonda S. Peace
(74) *Attorney, Agent, or Firm*—Workman Nydegger (57) ABSTRACT

A transceiver and assembly process is provided to passively align a lens within a transmitting sleeve of a duplex port assembly with a light emitting component within an insert molded package during the assembly of the transceiver. The transceiver design and manufacturing process allow for pivoting of the receiving sleeve around a substantially common access such that a light detecting component may be actively aligned with a lens included in a receiving sleeve of the duplex port assembly.

22 Claims, 4 Drawing Sheets

PASSIVE ALIGNMENT OF LASER WITH LENS ASSEMBLY

CROSS-REFERENCE TO RELATED APPLICATIONS

The present application claims the benefit of priority to U.S. Provisional Patent Application No. 60/533,115, filed on Dec. 30, 2003, entitled "PASSIVE ALIGNMENT OF LASER WITH LENS ASSEMBLY", the entire contents of which are incorporated herein by reference.

BACKGROUND OF THE INVENTION

1. The Field of the Invention

The present invention is generally related to optical transceivers used in fiber optic communications systems. More particularly, the present invention provides for a transceiver design and manufacturing process that allow for the passive alignment of an optical emitting component with a lens.

2. The Relevant Technology

Because of their high bandwidth and reliable high-speed data transmissions, fiber optic networks are increasingly becoming a popular mode of communication. These high-speed communication networks utilize optical-electronic components such as optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by a transceiver and transmitted in a fiber optical cable via the optical network, such as a local area network (LAN) backbone, for instance. The optical signal is then received by a reception node of the network. Once received by the reception node, the optical signal is fed to another optical transceiver for conversion via a photo-detector into electrical signals. The electrical signals are then forwarded to a host, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

Due to the power requirements and optical properties associated with the transfer of light to and from the transceiver to the optical fibers, transceivers should be fabricated with a high degree of accuracy. Accordingly, the active components (e.g., the laser and photo-detector) should typically be aligned within sub-micron accuracy with their respective lenses and optical fibers. Such precision alignment and fabrication is usually actively or manually performed by skilled technicians working with microscopes and high-precision manipulators. Once each optical device is assembled, it may be powered up and tested to verify proper performance and adjustments may be manually made as needed.

The laser and photo-detector typically resided on separate substrates disposed in a transmitter optical assembly ("TOSA") and receiver optical subassembly ("ROSA"), respectively. Accordingly, the alignment of the laser and photo-detector within a transceiver would take place separately, wherein one component, then the other, is aligned. Modem advancements, however, have simplified transceiver designs by including a single substrate structure that houses the active optical components for both the transmission and reception of optical signals. The singular substrate housing is attached to a duplex sleeve assembly that provides ports to which connectorized fiber optic cables are attached.

Although the unification of the TOSA and ROSA to produce a single transmitter/receiver optical assembly ("TROSA") has simplified transceiver design, the unification has increased the stringent requirements for aligning the active components to the respective lenses and fiber optics. For example, because the active components reside on a single substrate they must now be aligned with respect to one another, within micron tolerances. Similarly, the respective lenses within the duplex port assembly must be aligned with respect to one another, and then with respect to the active components when the substrate housing is attached to duplex port assembly. With the added degrees of alignment, as well as the constraints imposed by a single subassembly process (i.e., the attachment of the single substrate housing the active components with the duplex port assembly), the cost in aligning the appropriate components of a transceiver has dramatically increased.

BRIEF SUMMARY OF THE INVENTION

In accordance with exemplary embodiments of the present invention, the above-identified deficiencies, drawbacks and other limitations of current transceiver designs and manufacturing processes are overcome. For example, embodiments of the present invention provide for the manufacturing of an optical transceiver for use in an optical communications system. Among other things, the manufacturing process provides for assembling a molded package with a lens assembly while passively aligning a light emitting component with a respective lens.

For example, the optical transceiver manufacturing process provides for obtaining a duplex port assembly including a transmitting sleeve and a receiving sleeve, each with a respective lens positioned therein. Further, each of the sleeves are configured to receive a fiber optic cable that is capable of carrying optical signals. A unitary insert molded package is obtained that includes a light emitting component and a light detection component. The light emitting component is passively aligned with the lens in the transmitting sleeve by attaching the duplex port assembly to the unitary insert molded package such that a specified optical power from the light emitting component through the transmitting sleeve can be achieved.

In accordance with another embodiment of the present invention, a method of assembling an optical transceiver module is provided that attaches a lead frame to an insert molded package for connecting the optical transceiver module to a printed circuit board. The insert molded package is a plastic unitary structure for housing at least a light emitting component and a light detecting component. A transmitting sleeve and a receiving sleeve of a duplex port assembly may be attached onto the insert molded package such that one end of the transmitting sleeve is positioned over the light emitting component and one end of the receiving sleeve is positioned over the light detecting component. The light emitting component is passively positioned to be optically aligned, within a predetermined tolerance, with a lens included in the transmitting sleeve. Further, the light detecting component may be aligned with the lens included in the receiving sleeve by pivoting the receiving sleeve around a substantially common axis of the light emitting component and the lens including the transmitting sleeve.

In accordance with yet another embodiment of the present invention, an optical transceiver module is provided that includes transmitting and receiving optical assembly disposed in an insert molded package. Further, the insert molded package has a light emitting component positioned within a circular alignment reference feature for transmitting an optical signal, and a light detecting component that is adjacent to an angular alignment feature for receiving an optical signal. The transceiver module also includes a unitary duplex port assembly attached to the transmitting and receiving optical assembly, which has a transmitting sleeve which connects on one end to a fiber optic cable and has a cylindrical mating feature on another end that connects to the circular alignment reference feature. The unitary duplex port assembly also includes a receiving sleeve that connects on one end to a fiber optical cable and has an angular mating feature on another end that engages with the angular alignment feature.

In accordance with still yet another example embodiment of the present invention, an optical transceiver module is provided with a unitary duplex port assembly that has a transmitting sleeve and a receiving sleeve. The transmitting sleeve includes a transmitting lens and a cylindrical mating feature for aligning the transmitting lens with the laser, and the receiving sleeve has a receiving lens and an angular mating feature for aligning the receiving lens with a photo-detector. The optical transceiver module further includes an insert molded package attached to the unitary duplex port assembly. This insert molded package has a circular reference feature inserted into the cylindrical mating feature of the transmitting sleeve for passively aligning the laser within the insert molded package to the transmitting lens such that the circular reference feature is substantially coaxial with the transmitting lens. Further, the insert molded package also has an angular reference feature engaged with the angular mating feature of the receiving sleeve for actively aligning the photo-detector within the insert molded package to the receiving lens.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like or similar reference designations. It is understood that the drawings are example schematic representation of presently preferred embodiments of the invention, and are not limiting of the present invention nor are they necessarily drawn to scale.

FIGS. 1–6 depict various features of embodiments of the present invention, which is generally directed to an optical transceiver for use in optical communications and methods for manufacturing such. In particular, active optical components, such as a laser and photo-detector, are disposed together on a single printed circuit ("PC") board within an insert molded package for assembly with a duplex port assembly that includes transmitting and receiving sleeves. Embodiments of the present invention provide unique and innovative design and assembly processes for the passive alignment of an optical emitting component with a lens within the transmitting sleeve of the duplex port assembly when the insert molded package is attached to the duplex port assembly. Further, embodiments provide for a transceiver and manufacturing process that allow the pivoting of the receiving sleeve around a substantially common access of the light emitting component and the lens included in the transmitting sleeve such that a light detecting component may be actively aligned with a lens included in the receiving sleeve. As used herein, passive alignment refers to the automatic alignment of an optical device with its corresponding lens when the insert molded package is attached to the duplex port assembly. By contrast, active alignment means that some other manual positioning of the optical component with its respective lens may be needed.

Figure 1A:
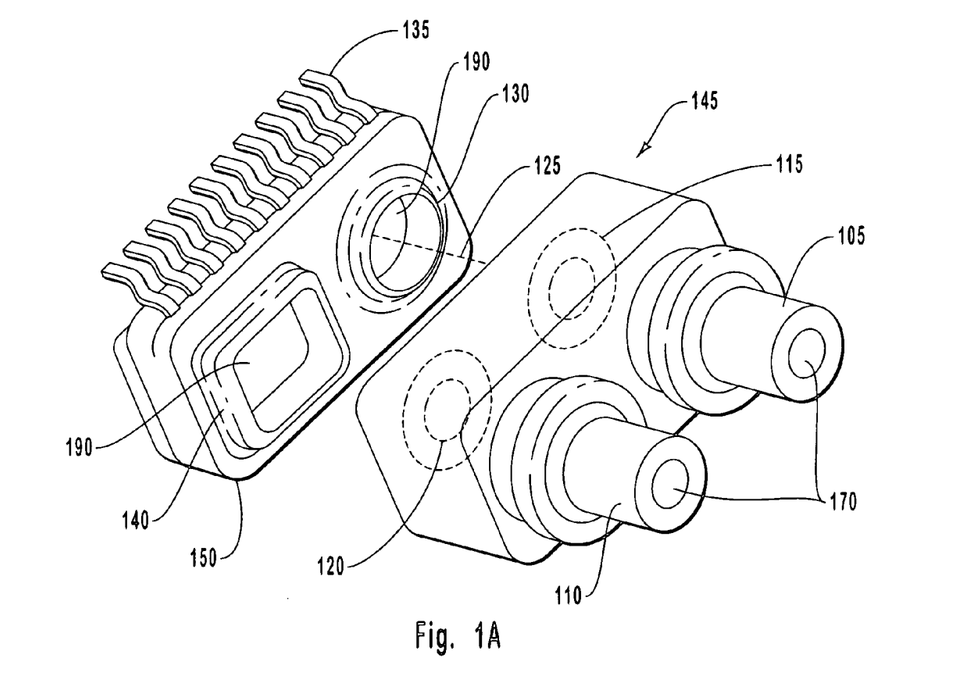
FIG. 1A illustrates a top view of a duplex port assembly and unitary insert molded package in accordance with example embodiments.

Referring to FIG. 1A, an optical transceiver for use in an optical communications system in accordance with example embodiments is shown. The transceiver includes both a duplex port assembly 145 and a unitary insert molded package 150 that will be attached together to produce a transmitter/receiver optical assembly ("TROSA").

The duplex port assembly 145 may be molded from plastic, metal, or any other suitable material that will allow for high precision alignment of the fiber bores 170—for both the transmitting sleeve 105 and receiving sleeve 110—with the corresponding lenses 115 and 120. The lenses 115 and 120 may be molded along with the housing for the duplex port assembly 145, or the lenses 115 and 120 may be aligned separately within the housing unit using current known techniques. In addition, a secondary lens disk (not shown) may be included into transmitting 105 and/or receiving 110 sleeves to assist in accurately aligning the lenses 115 and 120 to the fiber bores 170. As will be discussed in greater detail below, embodiments provide that the fiber bore 170 for the transmitting sleeve 105 should be precisely aligned to the transmitting lens 115, within micro tolerances. In other words, the center of the bore 170 that receives the fiber optical cable in the transmitting sleeve 105 should be aligned with the center of the transmitting lens 115 within approximately plus or minus 2 microns. This ensure that light signals can be effectively launched in a fiber optic cable.

The duplex port assembly 145 may be attached to a unitary insert molded package 150 such that the transmitting sleeve 105 of the duplex port assembly 145 is positioned over a circular alignment reference feature 130. The circular alignment reference feature 130 may surround an optical emitting component such as a laser diode (e.g., a vertical cavity surface emitting laser ("VCSEL"), not shown), which may be positioned onto a PC board 190 within the unitary insert molded package 150. The light emitting component or VCSEL should be precisely positioned within the circular alignment reference feature 130 within micron tolerances. In addition, the unitary insert molded package may be molded from a plastic, metal, or any other suitable material that allows the circular alignment reference feature 130 to be precisely molded within micron tolerances. As described below, it is the circular alignment reference feature 130, along with the tightly specified and molded manufacturing of the duplex port assembly 145, which allows for the passive alignment of the light emitting component with the transmitting lens 115. Thus, by simply connecting the duplex port assembly 145 with the insert molded package 150 automatically aligns the laser with the lens 115. Note that the molded package 150 further includes leads 135 for providing electrical connectivity to the package.

The insert molded package 150 also includes an angular alignment reference feature 140 for assisting in actively aligning a light detecting component (such as a photo-detector, not shown) that can be mounted on the PC board 190. As will be discussed in greater detail below, the duplex port assembly can pivot around an axis 125, which is essentially concentric with the center of the VCSEL and transmission lens 115 when assembling the transmitting sleeve 115 onto the circular alignment reference feature 130. Unlike the transmission side of the TROSA, the alignment of the receiving side can be somewhat relaxed due to the rotation and ability to actively align the photo-detector with the receiving sleeve 110 and lens 120. In other words, the precise positioning of the photo-detector onto the PC board 190 and molding of the angular reference feature does not have to be manufactured with as tight of tolerances as the transmission side. Photo detectors are comparatively larger than laser diodes. As a result, light signals can be detected successfully even if the photo detector is not perfectly aligned.

It should be noted that although the above and following description of example embodiments described the passive alignment of an optical emitting component with a lens within the transmitting sleeve and the active alignment of a light detecting component with a lens within the receiving sleeve of the TROSA, other methods and configuration for the assembly process are also possible. For example, the circular alignment reference feature 130 in the duplex port assembly 145 that surrounds an optical emitting component may instead surround a light detecting component, such as a photo-detector. Accordingly, the circular alignment reference feature 130 along with the tightly specified molded manufacturing of the unitary insert molded package 150 and the duplex port assembly 145 could assist in the passive alignment of the light detecting component with the receiving lens 120 in the duplex port assembly 145. As such, the insert molded package 150 may include an angular alignment reference feature 140 for assisting and actively aligning the optical emitting component with the transmitting sleeve 105 in the duplex port assembly 145, in a similar manner as that described above with regard to the light detecting component.

Due to the relative size of typical optical emitting components with typical light detecting components, however, it may be preferred that the light detecting component is positioned on the passive alignment side of the TROSA. Nevertheless, example embodiments give great flexibility in which side of the TROSA should be tightly molded and which side may be relaxed. Further, although angular reference feature 140 on the insert molded package 150 is shown as a rectangular feature, other angular geometries may also be used to actively align the relaxed side of the TROSA. For example, angular reference feature 140 may be a triangle, square, rectangle, parallelogram or any other angular geometry that would allow for partial rotation of the duplex port assembly 145 around axis 125 when connected to the insert molded package 150.

Figure 1B:
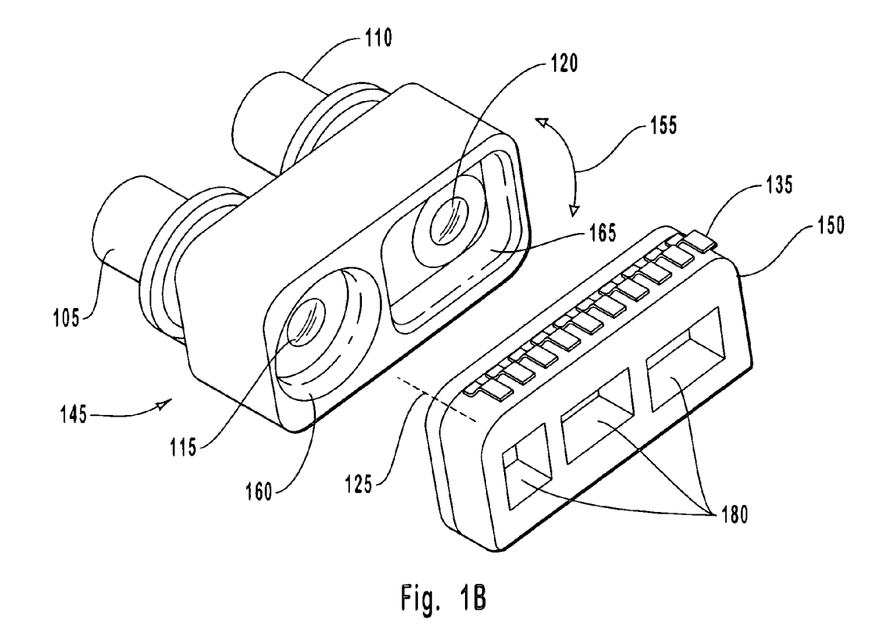
FIG. 1B illustrates a base view of a duplex port assembly and unitary insert molded package in accordance with example embodiments.

FIG. 1B illustrates a base view of the duplex port assembly 145 and unitary insert molded package 150 in accordance with example embodiments. As described above, the duplex port assembly 145 includes a transmitting sleeve 105 and a receiving sleeve 110 that may be precisely molded and aligned with their corresponding lenses 115 and 120 within duplex port assembly 145. The duplex port assembly also includes a cylindrical mating feature 160 on the end of the transmitting sleeve 105 that may be connected to the circular alignment reference feature 130 on the insert molded package 150. Similar to the circular alignment reference feature 130, the cylindrical mating feature 160 should be molded to tight tolerances of plus or minus a few microns in order to passively align the optical emitting component with the lens 115 in the transmitting sleeve 105 when the duplex port assembly 145 is attached to the insert molded package 150. Accordingly, the connection of the circular alignment reference feature 130 with the cylindrical mating feature 160 provides for passive alignment of the laser with the transmission lens 115 within the duplex port assembly 145. Further, this connection provides for rotation of the duplex port assembly 145 around a substantially common axis 125 of the light emitting component and the lens 115 in the transmitting sleeve 105. This rotation of the duplex port assembly 145 does not impact the passively aligned section of the laser with the transmission lens 115.

Also shown in FIG. 1B, receiving sleeve 110 includes an angular mating feature 165 at its base end. The angular mating feature 165 engages with the angular alignment reference feature 140 of the insert molded package 150. Similar to the angular alignment reference feature 140, the molding of the angular mating feature 165 can be somewhat relaxed in order to allow some rotation of the duplex port assembly 145 around the substantially common axis 125 when the duplex port assembly 145 is attached to the insert molded package 150. This allows for the active alignment of the light detecting component to the lens 120 within the duplex port assembly 145. Line 155 illustrates the angular motion for which duplex port assembly 145 may rotate around the substantially common axis 125 when the duplex port assembly 145 is attached to the insert molded package 150.

In accordance with other example embodiments, also shown in FIG. 1B, the base of the insert molded package 150 may contain various ports 180. These ports 180 allow for additional components that are internally included within a typical transceiver module to be mounted on a PC board (e.g., board 190) within the insert molded package 150 housing. These components may include, e.g., a controller for governing the general operation of the transceiver, a laser drive for controlling the operation of the VCSEL in the transmitter portion, a post amplifier for controlling the photo-detector that converts incoming optical signals into electrical signals in the receiver portion, or any other active or passive components typical of known transceiver modules.

Figure 2A:
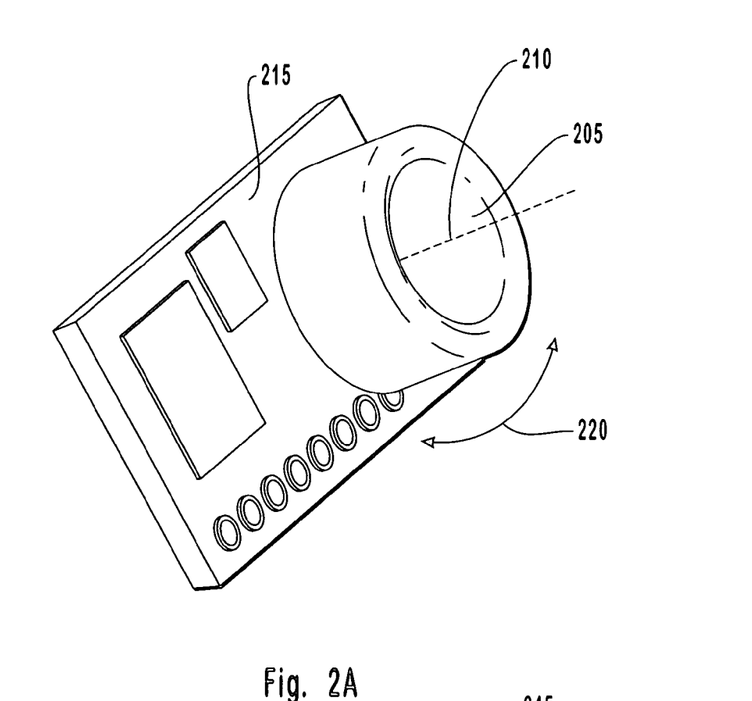
FIG. 2A illustrates a detailed view of a circular alignment reference feature and substrate in accordance with example embodiments.

FIG. 2A illustrates a detailed view of a circular alignment reference feature 205 and a substrate, such as a PC board 215, in accordance with example embodiments. A VCSEL, or other light emitting component, may be positioned and attached to PC board 215 such that its center is substantially aligned with axis 210. As previously mentioned, circular alignment reference feature 205 should be tightly molded to within tolerances of plus or minus a few microns such that the axis 210 is essentially the center line of circular alignment reference feature. Accordingly, example embodiments provide that when a cylindrical mating feature on one side of a transmitter sleeve for a duplex port assembly is connected to circular alignment reference feature 205, the VCSEL may be passively aligned with a transmitter lens within the duplex port assembly. Further, line 220 illustrates the motion for which a duplex port assembly should be allowed to rotate about axis 210 in order to passively align a photo-detector (also on PC board 215) with its respective receiving lens on a duplex port assembly.

Figure 2B:
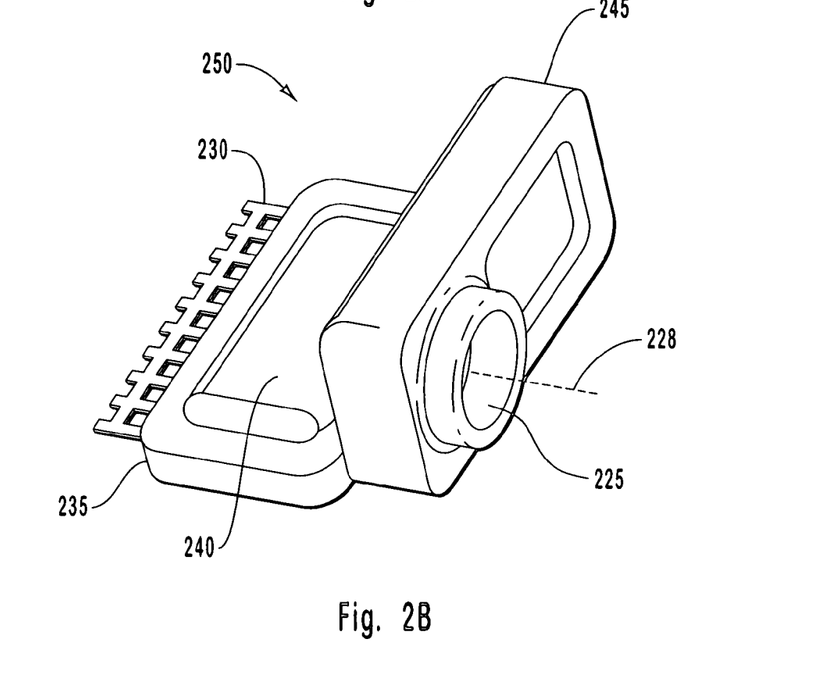
FIG. 2B illustrates a sectional view of the insert molded package, substrate, and lead frame in accordance with example embodiments.

FIG. 2B illustrates a sectional view of an insert molded package 250 with substrate 240 and lead frame 230 in accordance with example embodiments. A base 235 of the insert molded package 250 may be molded around the lead frame 230 that feeds into a substrate 240 with conductive traces that interconnect with active and other optical components (not shown). Base 235 may be attached to the alignment feature housing 245 of the insert molded package, having a circular alignment reference feature 225 and axis 228, to which a duplex port assembly (not shown) may be attached in accordance with embodiments described above.

Figure 3:
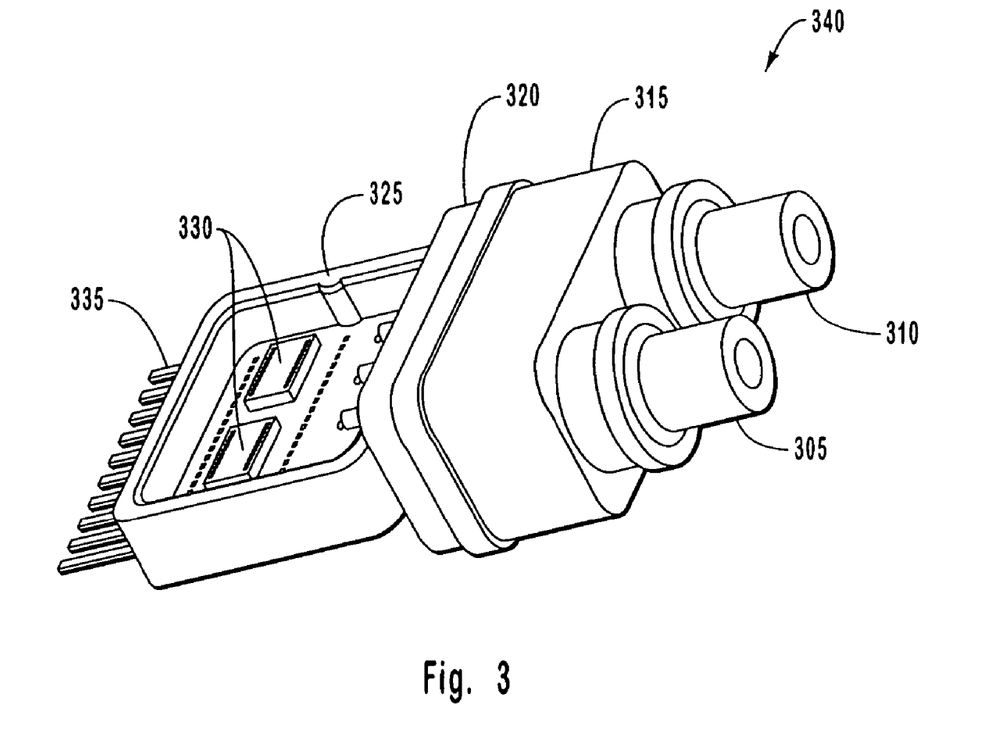
FIG. 3 illustrates an assembled transceiver in accordance with example embodiments of the present invention.

FIG. 3 illustrates a transceiver in accordance with example embodiments of the present invention. TROSA 340 includes a duplex port assembly 315 with transmitting sleeve 305 and receiving sleeve 310 attached to a insert molded package 320. After alignment in accordance with example embodiments herein, the duplex port assembly 315 may be secured to the unitary insert molded package 320 by a clip, staple, adhesive, welding process, barbed pin, or any other well known means. Attached to the base of the TROSA is a housing 325 that includes a PC board for attaching various active and passive components 330 as typically included in an optical transceiver device. Leads 335 may be used to electronically connect the transceiver to other appropriate hardware, such as a computer.

It should be understood that this and other arrangements and processes described herein are set forth for purposes of example only, and other elements and systems (e.g., machines, interfaces, functions, orders of elements, etc.) can be added or used instead and/or some elements may be omitted altogether. Further, those skilled in the art will appreciate that many of the elements described herein are functional entities that may be implemented as discrete components or in conjunction with other components in any suitable combination and location and by software, firmware and/or hardware.

The present invention may also be described in terms of methods for assembling the transceiver device. The following is a description of manufacturing processes that may be performed in practicing the present invention. Although the process elements may be described or claimed in a particular order, the present invention is not necessarily limited to any particular ordering or combination of these processes.

Figure 4:
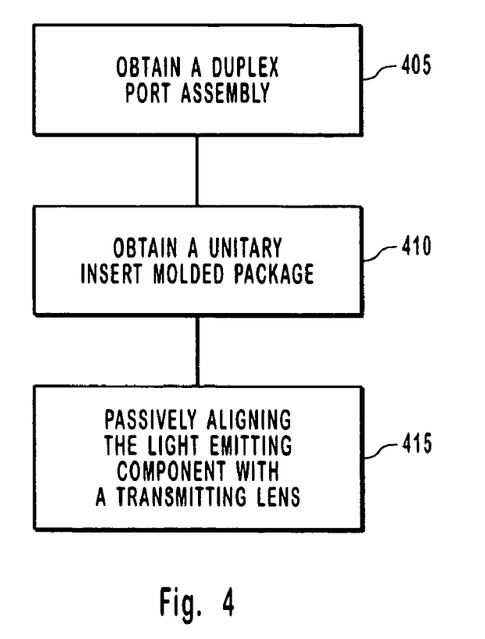
FIG. 4 illustrates a process for passively aligning a light emitting component with transmitting lens in accordance with example embodiments.

FIG. 4 illustrates a flow diagram of an exemplary method for passively aligning a light emitting component with a transmitting lens in accordance with example embodiments. More particularly, FIG. 4 shows the manufacturing of an optical transceiver for use in an optical communications system by an example method of assembling a molded package with a lens assembly while passively aligning a light emitting component with a respective lens. A duplex port assembly may be obtained in 405, which includes a transmitting sleeve and a receiving sleeve each with a respective lens positioned therein. Each of the sleeves may be configured to receive a fiber optic cable that is capable of carrying optical signals. A unitary insert molded package may be obtained in 410 that includes a light emitting component and a light detection component. The light emitting component may be passively aligned with the lens in 415 by attaching the duplex port assembly to the unitary insert molded package such that a specified optical power from the light emitting component through the transmitting sleeve can be achieved.

Other embodiments provide for placing the light emitting component on a substrate of the unitary insert molded package within and substantially at an axis of a circular alignment reference feature. Further, the circular alignment reference feature around the light emitting component may connect with a cylindrical mating feature on an end of the transmitting sleeve when the duplex port assembly is attached to the unitary insert molded package. The connection between the circular alignment reference feature and the cylindrical mating feature passively aligns the light emitting component with the lens in the transmitting sleeve.

Still other embodiments allow for actively aligning the light detection component with the lens of the receiving sleeve by rotating the duplex port assembly around a substantially common axis of the light emitting component and the lens in the transmitting sleeve when they are passively aligned. An angular alignment reference feature adjacent to the light detection component may engage with an angular mating feature on an end of the receiving sleeve when the duplex port assembly is attached to the unitary insert molded package. The engagement of the angular alignment reference feature with the angular mating feature may be such to allow enough rotation of the duplex port assembly around the substantially common axis to allow for active alignment of a light detection component with the lens of the receiving sleeve.

Yet still other embodiments provide for securing the duplex port assembly to the unitary insert molded package after the light emitting component has been passively aligned with the lens in the transmitting sleeve. Other example embodiments, provide for securing the duplex port assembly to the unitary insert molded package after the light detection component has been actively aligned with the lens in the receiving sleeve. The duplex port assembly may be secured to the unitary insert molded package by a clip, barbed pin, staple or any other known means.

Figure 5:
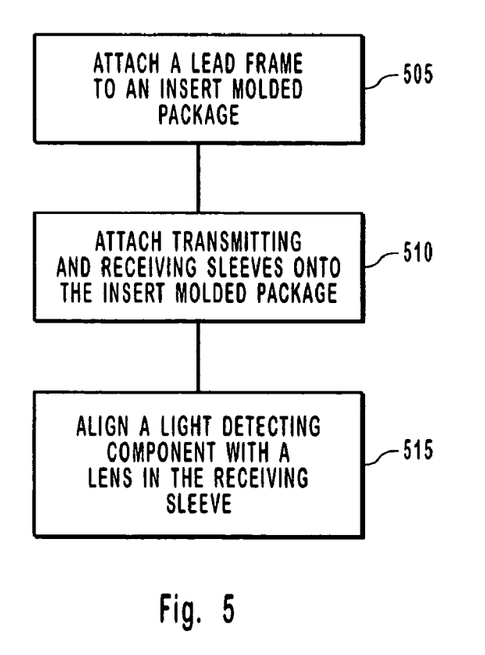
FIG. 5 illustrates a process for attaching transmitting and receiving sleeves onto an insert molded package in accordance with example embodiments.

FIG. 5 illustrates a flow diagram for a method of assembling an optical transceiver module in accordance with yet other example embodiments. For instance, a lead frame may be attached in 505 to an insert molded package for connecting the optical transceiver module to a printed circuit board. The insert molded package may be a plastic unitary structure for housing at least a light emitting component and a light detecting component. A transmitting sleeve and a receiving sleeve of a duplex port assembly may be attached in 510 onto the insert molded package such that one end of the transmitting sleeve is positioned over the light emitting component and one end of the receiving sleeve is positioned over the light detecting component. The light emitting component may be passively positioned to be optically aligned (within a predetermined tolerance) with a lens included in the transmitting sleeve. The light detecting component may then be aligned in 515 with a lens included in the receiving sleeve by pivoting the receiving sleeve around a substantially common axis of the light emitting component and the lens included in the transmitting sleeve.

Other embodiments provide for securing the duplex port assembly to the unitary insert molded package after the light emitting component has been passively aligned with the lens in the transmitting sleeve. Still yet other example embodiments provide for securing the duplex port assembly to the unitary insert molded package after the light detection component has been actively aligned with the lens in the receiving sleeve.

Example embodiments provide that the light emitting component may be placed on a substrate of the unitary insert molded package within and substantially at an axis of a circular alignment reference feature. The circular alignment reference feature around the light emitting component may connect with a cylindrical mating feature on an end of the transmitting sleeve when the transmitting sleeve and the receiving sleeve of the duplex port assembly is attached to the insert molded package. The connection between the circular alignment reference feature and the cylindrical mating feature may passively align the light emitting component with the lens included in the transmitting sleeve.

In still yet other embodiments, the light detecting component may be placed on a substrate of the unitary insert molded package within an angular alignment reference feature. The angular alignment reference feature may be adjacent to the light detecting component and engage an angular mating feature on an end of the receiving sleeve when the transmitting sleeve and receiving sleeve of the duplex port assembly is attached to the insert molded package.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In the manufacturing of an optical transceiver for use in an optical communication system, a method of assembling a molded package with a lens assembly while passively aligning a light emitting component with a respective lens, comprising:

obtaining a duplex port assembly including a transmitting sleeve and a receiving sleeve each with a respective lens positioned therein, and each of the sleeves being configured to receive a fiber optic cable that is capable of carrying optical signals;

obtaining a unitary insert molded package that includes a light emitting component and a light detection component;

placing the light emitting component on a substrate of the unitary insert molded package within and substantially at an axis of a circular alignment reference feature; and passively aligning the light emitting component with the lens in the transmitting sleeve by attaching the duplex port assembly to the unitary insert molded package such that a specified optical power from the light emitting component through the transmitting sleeve can be achieved.

2. The method of claim 1, wherein the circular alignment reference feature around the light emitting component connects with a cylindrical mating feature on an end of the transmitting sleeve when the duplex port assembly is attached to the unitary insert molded package.

3. The method of claim 2, wherein the connection between the circular alignment reference feature and the cylindrical mating reference feature passively aligns the light emitting component with the lens in the transmitting sleeve.

4. The method of claim 3, further comprising actively aligning the light detection component with the lens of the receiving sleeve by rotating the duplex port assembly around a substantially common axis of the light emitting component and the lens in the transmitting sleeve when they are passively aligned.

5. The method of claim 4, wherein an angular alignment reference feature adjacent to the light detection component engages an angular mating feature on an end of the receiving sleeve when the duplex port assembly is attached to the unitary insert molded package.

6. The method of claim 5, wherein the engagement of the angular alignment reference feature with the angular mating feature is such to allow enough rotation of the duplex port assembly around the substantially common axis to allow for active alignment of the light detection component with the lens of the receiving sleeve.

7. The method of claim 1, further comprising securing the duplex port assembly to the unitary insert molded package after the light emitting component has been passively aligned with the lens in the transmitting sleeve.

8. The method of claim 4, further comprising securing the duplex port assembly to the unitary insert molded package after the light detection component has been actively aligned with the lens in the receiving sleeve.

9. An optical transceiver module, comprising:

a transmitting and receiving optical assembly disposed in an insert molded package that includes:
 a light emitting component positioned within a circular alignment reference feature for transmitting an optical signal, and
 a light detecting component being adjacent to an angular alignment feature for receiving an optical signal; and a unitary duplex port assembly attached to the transmitting and receiving optical assembly, the unitary duplex port assembly including:
 a transmitting sleeve that connects on one end to a fiber optic cable and has a cylindrical mating feature on another end that connects to the circular alignment reference feature, and
 a receiving sleeve that connects on one end to a fiber optic cable and has an angular mating feature on another end that engages with the angular alignment feature.

10. The optical transceiver module of claim 9, wherein the transmitting sleeve further includes a transmitting lens that is substantially coaxial with the circular alignment reference feature within a predefined tolerance.

11. The optical transceiver module of claim 10, wherein the receiving sleeve further includes a receiving lens that is optically aligned with the light detecting component within a predefined tolerance.

12. The optical transceiver module of claim 9, wherein the angular alignment feature is one of a triangle, rectangle or parallelogram.

13. The optical transceiver module of claim 9, wherein the duplex port assembly is secured to the unitary insert molded package one of a clip, barbed pin or staple.

14. The optical transceiver module of claim 9, further comprising a lead frame for connecting the optical transceiver module to a printed circuit board, wherein the insert molded package is formed around the lead frame.

15. A method of assembling an optical transceiver module, comprising:
   attaching a lead frame to an insert molded package for connecting the optical transceiver module to a printed circuit board, wherein the insert molded package is a plastic unitary structure for housing at least a light emitting component and a light detecting component;
   attaching a transmitting sleeve and a receiving sleeve of a duplex port assembly onto the insert molded package such that one end of the transmitting sleeve is positioned over the light emitting component and one end of the receiving sleeve is positioned over the light detecting component, wherein the light emitting component is passively positioned to be optically aligned, within a predetermined tolerance, with a lens included in the transmitting sleeve; and
   aligning the light detecting component with a lens included in the receiving sleeve by pivoting the receiving sleeve around a substantially common axis of the light emitting component and the lens included in the transmitting sleeve.

16. The method of claim 15, further comprising securing the duplex port assembly to the unitary insert molded package after the light emitting component has been passively aligned with the lens in the transmitting sleeve.

17. The method of claim 15, further comprising securing the duplex port assembly to the unitary insert molded package after the light detection component has been actively aligned with the lens in the receiving sleeve.

18. The method of claim 15, further comprising placing the light emitting component on a substrate of the unitary insert molded package within and substantially at an axis of a circular alignment reference feature.

19. The method of claim 18, wherein the circular alignment reference feature around the light emitting component connects with a cylindrical mating feature on an end of the transmitting sleeve when the transmitting sleeve and receiving sleeve of the duplex port assembly is attached to the insert molded package.

20. The method of claim 19, wherein the connection between the circular alignment reference feature and the cylindrical mating reference feature passively aligns the light emitting component with the lens included in the transmitting sleeve.

21. The method of claim 15, further comprising placing the light detecting component on a substrate of the unitary insert molded package within an angular alignment reference feature.

22. The method of claim 21, wherein the angular alignment reference feature adjacent to the light detecting component engages an angular mating feature on an end of the receiving sleeve when the transmitting sleeve and receiving sleeve of the duplex port assembly is attached to the insert molded package.

* * * * *

UNITED STATES PATENT AND TRADEMARK OFFICE
CERTIFICATE OF CORRECTION

PATENT NO. : 7,056,034 B2  Page 1 of 1
APPLICATION NO. : 11/027041
DATED : June 6, 2006
INVENTOR(S) : Togami et al.

It is certified that error appears in the above-identified patent and that said Letters Patent is hereby corrected as shown below:

Title Page
Item 75, Inventors, Line 1, after "K" insert --,--

Column 1
Line 60, change "assembly" to --subassembly--
Line 65, change "Modem" to --Modern--

Column 4
Line 18, change "1-6" to --1-5--
Line 64, change "micro" to --micron--

Column 5
Line 1, change "ensure" to --ensures--
Line 23, remove "by"
Lines 56-57, change "duplex port assembly 145" to --unitary insert molded package 150--

Column 6
Line 1, change "105" to --110--

Column 7
Line 2, change "drive" to --driver--

Column 9
Line 27, change "is" to --are--

Signed and Sealed this

Twenty-third Day of September, 2008

JON W. DUDAS
*Director of the United States Patent and Trademark Office*